United States Patent
Karuturi et al.

(10) Patent No.: US 8,737,304 B2
(45) Date of Patent: May 27, 2014

(54) METHODS, SYSTEMS, AND COMPUTER READABLE MEDIA FOR HYBRID SESSION BASED DIAMETER ROUTING

(75) Inventors: Sridhar Karuturi, Raleigh, NC (US); Peter J. Marsico, Chapel Hill, NC (US)

(73) Assignee: Tekelec, Inc., Morrisville, NC (US)

( * ) Notice: Subject to any disclaimer, the term of this patent is extended or adjusted under 35 U.S.C. 154(b) by 0 days.

(21) Appl. No.: 13/409,949

(22) Filed: Mar. 1, 2012

(65) Prior Publication Data

US 2012/0224531 A1    Sep. 6, 2012

Related U.S. Application Data

(60) Provisional application No. 61/448,044, filed on Mar. 1, 2011.

(51) Int. Cl.
*H04W 4/00* (2009.01)

(52) U.S. Cl.
USPC ........... 370/328; 370/248; 370/389; 455/411; 709/226; 709/227; 709/229; 709/238

(58) Field of Classification Search
None
See application file for complete search history.

(56) References Cited

U.S. PATENT DOCUMENTS

| | | | |
|---|---|---|---|
| 1,872,857 A | 4/1931 | Wesson et al. | |
| 6,298,383 B1 | 10/2001 | Gutman et al. | |
| 7,292,592 B2 | 11/2007 | Rune | |
| 7,551,926 B2 | 6/2009 | Rune | |
| 8,015,293 B2 | 9/2011 | Schaedler et al. | |
| 8,547,908 B2 | 10/2013 | Marsico | |
| 8,615,237 B2 | 12/2013 | Baniel et al. | |
| 2002/0147845 A1 | 10/2002 | Sanchez-Herrero | |
| 2002/0194378 A1 | 12/2002 | Foti | |
| 2002/0196775 A1 | 12/2002 | Tuohino et al. | |
| 2003/0040280 A1 | 2/2003 | Koskelainen | |

(Continued)

FOREIGN PATENT DOCUMENTS

| | | | |
|---|---|---|---|
| EP | 1 357 720 A1 | 10/2003 | |
| EP | 2 242 205 A1 | 10/2010 | |

(Continued)

OTHER PUBLICATIONS

Non-Final Official Action for U.S. Appl. No. 12/409,914 (Nov. 6, 2012).

(Continued)

*Primary Examiner* — Ian N Moore
*Assistant Examiner* — Eric H Wang
(74) *Attorney, Agent, or Firm* — Jenkins, Wilson, Taylor & Hunt, P.A.

(57) ABSTRACT

Methods, systems, and computer readable media for hybrid session based Diameter routing are disclosed. According to one method, the method comprises receiving, at a first Diameter signaling router (DSR), a first Diameter message for processing by a Diameter server. The method also includes selecting, using a Diameter node selection algorithm that operates on at least one parameter in the first Diameter message without requiring use of stored Diameter binding information, a first Diameter server to which the first Diameter message is to be routed. The method further includes determining whether the first Diameter server is available. The method also includes, in response to determining that the first Diameter server is not available, selecting a second Diameter server to which the first Diameter message is to be routed and creating an exception binding record that associates the second Diameter server and information in the first Diameter message.

21 Claims, 9 Drawing Sheets

(56) References Cited

U.S. PATENT DOCUMENTS

| | | |
|---|---|---|
| 2003/0131151 A1 | 7/2003 | Roach et al. |
| 2004/0103157 A1 | 5/2004 | Requena et al. |
| 2004/0152469 A1 | 8/2004 | Yla-Outinen et al. |
| 2004/0205212 A1 | 10/2004 | Huotari et al. |
| 2004/0223489 A1 | 11/2004 | Rotsten et al. |
| 2004/0225878 A1 | 11/2004 | Costa-Requena et al. |
| 2004/0246965 A1 | 12/2004 | Westman et al. |
| 2005/0007984 A1 | 1/2005 | Shaheen et al. |
| 2005/0009520 A1 | 1/2005 | Herrero et al. |
| 2005/0058125 A1 | 3/2005 | Mutikainen et al. |
| 2005/0078642 A1 | 4/2005 | Mayer et al. |
| 2005/0094594 A1 | 5/2005 | Roh |
| 2005/0120198 A1 | 6/2005 | Bajko et al. |
| 2005/0124341 A1 | 6/2005 | Myllymaki et al. |
| 2005/0136926 A1 | 6/2005 | Tammi et al. |
| 2005/0155036 A1 | 7/2005 | Tiainen et al. |
| 2005/0159156 A1 | 7/2005 | Bajko et al. |
| 2005/0235000 A1 | 10/2005 | Keil |
| 2006/0030320 A1 | 2/2006 | Tammi et al. |
| 2006/0045249 A1 | 3/2006 | Li et al. |
| 2006/0068816 A1 | 3/2006 | Pelaez et al. |
| 2006/0077926 A1 | 4/2006 | Rune |
| 2006/0078119 A1 | 4/2006 | Jee et al. |
| 2006/0136557 A1 | 6/2006 | Schaedler et al. |
| 2006/0161512 A1 | 7/2006 | Schaedler et al. |
| 2006/0172730 A1 | 8/2006 | Matsuda |
| 2006/0221972 A1 | 10/2006 | Bhargava et al. |
| 2006/0259759 A1 | 11/2006 | Maino et al. |
| 2006/0274744 A1 | 12/2006 | Nagai et al. |
| 2007/0121596 A1 | 5/2007 | Kurapati et al. |
| 2007/0242637 A1* | 10/2007 | Dynarski et al. ............... 370/331 |
| 2007/0297419 A1 | 12/2007 | Asherup et al. |
| 2008/0039104 A1 | 2/2008 | Gu et al. |
| 2009/0080440 A1 | 3/2009 | Balyan et al. |
| 2009/0129271 A1 | 5/2009 | Ramankutty et al. |
| 2009/0196231 A1 | 8/2009 | Giaretta et al. |
| 2009/0196290 A1 | 8/2009 | Zhao et al. |
| 2009/0221310 A1 | 9/2009 | Chen et al. |
| 2009/0232011 A1 | 9/2009 | Li et al. |
| 2009/0264097 A1 | 10/2009 | Cai et al. |
| 2009/0265467 A1 | 10/2009 | Peles |
| 2009/0305684 A1* | 12/2009 | Jones et al. .................... 455/418 |
| 2009/0313379 A1 | 12/2009 | Rydnell et al. |
| 2010/0290392 A1 | 11/2010 | Rasanen et al. |
| 2010/0291923 A1 | 11/2010 | Zhou et al. |
| 2010/0299451 A1 | 11/2010 | Yigang et al. |
| 2010/0311392 A1* | 12/2010 | Stenfelt et al. ................. 455/411 |
| 2010/0331023 A1 | 12/2010 | Cai et al. |
| 2011/0116378 A1 | 5/2011 | Ramankutty et al. |
| 2011/0116382 A1 | 5/2011 | McCann et al. |
| 2011/0165901 A1 | 7/2011 | Baniel et al. |
| 2011/0199906 A1 | 8/2011 | Kanode et al. |
| 2011/0200053 A1 | 8/2011 | Kanode et al. |
| 2011/0202612 A1 | 8/2011 | Craig et al. |
| 2011/0202614 A1 | 8/2011 | Craig et al. |
| 2011/0202676 A1 | 8/2011 | Craig et al. |
| 2011/0225113 A1 | 9/2011 | Mann |
| 2011/0225280 A1 | 9/2011 | Delsesto et al. |
| 2011/0225306 A1 | 9/2011 | Delsesto et al. |
| 2011/0282904 A1 | 11/2011 | Schaedler et al. |
| 2011/0302244 A1 | 12/2011 | McCann et al. |
| 2011/0314178 A1 | 12/2011 | Kanode et al. |
| 2012/0096177 A1 | 4/2012 | Rasanen |
| 2012/0124220 A1 | 5/2012 | Zhou et al. |
| 2012/0155389 A1 | 6/2012 | McNamee et al. |
| 2012/0155470 A1 | 6/2012 | McNamee et al. |
| 2012/0202550 A1 | 8/2012 | Marsico |
| 2012/0224524 A1 | 9/2012 | Marsico |
| 2012/0225679 A1 | 9/2012 | McCann et al. |
| 2012/0226758 A1 | 9/2012 | Sprague et al. |
| 2012/0226814 A1 | 9/2012 | Stucker |
| 2012/0239771 A1 | 9/2012 | Rasanen |
| 2012/0311064 A1 | 12/2012 | Deo |

FOREIGN PATENT DOCUMENTS

| | | | |
|---|---|---|---|
| EP | 2 220 841 | B1 | 9/2011 |
| EP | EP 1 846 832 | B1 | 4/2012 |
| WO | WO 2006/066149 | A2 | 6/2006 |
| WO | WO 2010/139360 | A1 | 12/2010 |
| WO | WO 2011/082090 | A2 | 7/2011 |
| WO | WO 2011/156274 | A2 | 12/2011 |
| WO | WO 2012/106710 | A1 | 8/2012 |
| WO | WO 2012/118959 | A1 | 9/2012 |
| WO | WO 2012/118963 | A1 | 9/2012 |
| WO | WO 2012/119147 | A1 | 9/2012 |
| WO | WO 2012/154674 | A2 | 11/2012 |

OTHER PUBLICATIONS

Notification of Transmittal of the International Search Report and the Written Opinion of the International Searching Authority, or the Declaration for International Patent Application No. PCT/US2012/036784 (Nov. 1, 2012).

Non-Final Official Action for U.S. Appl. No. 13/412,352 (Oct. 26, 2012).

Communication of European publication number and information on the application of Article 67(3) EPC for European Patent Application No. 10841605.8 (Oct. 17, 2012).

Commonly-assigned, co-pending U.S. Appl. No. 13/465,552 for "Methods, Systems, and Computer Readable Media for Caching Call Session Control Function (CSCF) Data at a Diameter Signaling Router (DSR)," (Unpublished, filed May 7, 2012).

PCT International Patent Application No. PCT/US2012/036784, Titled, "Methods, Systems, and Computer Readable Media for Steering a Subscriber Between Access Networks," (Unpublished, Filed May 7, 2012).

Decision to grant a European patent pursuant to Article 97(1) EPC for European Application No. 05854512.0 (Mar. 15, 2012).

Communication under Rule 71(3) EPC for European application No. 05854512.0 (Nov. 11, 2011).

Notice of Allowance and Fee(s) Due for U.S. Appl. No. 11/303,757 (May 11, 2011).

Official Action for U.S. Appl. No. 11/303,757 (Dec. 22, 2010).

3GPP, "3rd Generation Partnership Project; Technical Specification Group Core Network and Terminals; Sh Interface based on the Diameter protocol; Protocol details (Release 8)," 3GPP TS 29.329, V8.8.0 (Dec. 2010).

Communication pursuant to Article 94(3) EPC for European Application No. 05 854 512.0 (Oct. 12, 2010).

"Digital cellular telecommunications system (Phase 2+); Universal Mobile Telecommunications System (UMTS); LTE; IP Multimedia Subsystem (IMS); Stage 2 (3GPP TS 23.228 version 9.4.0 Release 9)," ETSI TS 123 228, V9.4.0 (Oct. 2010).

"Digital cellular telecommunications system (Phase 2+); Universal Mobile Telecommunications System (UMTS); LTE; End-to-end Quality of Service (QoS) concept and architecture (3GPP TS 23.207 version 9.0.0 Release 9)," ETSI TS 123 207, V9.0.0 (Oct. 2010).

"3rd Gerneration Partnership Project; Technical Specification Group Services and System Aspects; Telecommunication management; Charging management; Packet Switched (PS) domain charging (Release 9)," 3GPP TS 32.251. V9.4.0 (Oct. 2010).

Communication pursuant to Article 94(3) EPC for European Application No. 05854512.0 (Feb. 8, 2010).

Final Official Action for U.S. Appl. No. 11/303,757 (Dec. 9, 2009).

Supplementary European Search Report for European Application No. 05854512.0 (Nov. 17, 2009).

Official Action for U.S. Appl. No. 11/303,757 (May 28, 2009).

Final Official Action for U.S. Appl. No. 11/303,757 (Oct. 6, 2008).

Official Action for U.S. Appl. No. 11/303,757 (May 7, 2008).

Notification of Transmittal of the International Search Report and the Written Opinion corresponding to International Application No. PCT/US05/45813 (Mar. 24, 2008).

Official Action for U.S. Appl. No. 11/303,757 (Feb. 21, 2008).

Restriction Requirment for U.S. Appl. No. 11/303,757 (Oct. 4, 2007).

"Tekelec Announces TekCore IMS Core Platform," (Jun. 5, 2006).

"Operator Guidebook to IMS and New Generation Networks and Services," www.morianagroup.com, Second Edition (Feb. 2006).

(56) References Cited

OTHER PUBLICATIONS

Hakala et al., "Diameter Credit-Control Application," RFC 4006, pp. 1-114 (Aug, 2005).
Calhoun et al., "Diameter Network Access Server Application," RFC 4005, pp. 1-85 (Aug. 2005).
Calhoun et al., "Diameter Mobile IPv4 Application," RFC 4004, pp. 1-53 (Aug. 2005).
"Operator Guidebook to IMS and New Generation Networks and Services," www.morianagroup.com, First Edition, pp. 1-450 (Aug. 2005) (Part 1 of 2).
"Operator Guidebook to IMS and New Generation Networks and Services," www.morianagroup.com, First Edition, pp. 451-934 (Aug. 2005) (Part 2 of 2).
Gonzalo et al., "The 3G IP Multimedia Subsystem," Chapter 3: General Principles of the IMS Architecture (Aug. 20, 2004).
"IP Multimedia Subsystem IMS Over and Applications," 3G Americas, pp. 1-17 (Jul. 2004).
"3rd Generation Partnership Project; technical Specification Group Core Network; IP Multimedia (IM) Session Handling; IM Call Model; Stage 2 (Release 6)," 3GPP TS 23.218, V6.1.0, pp. 1-56 (Mar. 2004).
"IMS Security Framework," 3GPP2 S.R0086-0, Version 1.0, pp. 1-39 (Dec. 11, 2003).
"IP Multimedia Subsystem—Accounting Information Flows and Protocol," 3GGP2 X.S0013-008-0, Version 1.0, pp. 1-42 (Dec. 2003).
"IP Multimedia Subsystem—Charging Architecture," 3GPP2 X.S0013-007-0, Version 1.0, pp. 1-16 (Dec. 2003).
"All-IP Core Network Multimedia Domain," 3rd Generation Partnerships Project 2 (3GPP2), 3GPP2 X.S0013-000-0, Version 1.0, pp. i-ii and 1-14 (Dec. 2003).
"3rd Generation Partnership Project; Technical Specification Group Core Network; Cx and Dx Interfaces Based on the Diameter Protocol; Protocol Details (Release 5)," 3GPP TS 29.229, V5.6.0, pp. 1-23 (Dec. 2003).
"Digital Cellular Telecommunications System (Phase 2+); Universal Mobile Telecommunications System (UMTS); IP Multimedia Subsystem (IMS); Stage 2 (Release 5)," 3GPP TS 23.228, V5.7.0, pp. 1-130 (Dec. 2002).
Olson et al., "Support for IPv6 in Session Description Protocol (SDP)," RFC 3266, pp. 1-5 (Jun. 2002).
Rosenberg et al., "SIP: Session Initiation Protocol," RFC 3261, pp. 1-252 (Jun. 2002).
Howard, "Sipping IETF51 3GPP Security and Authentication," http://www3.ietf.org/proceedings/01aug/slides/sipping-7/index.htm (Dowloaded from Internet on Dec. 16,2005) (Sep. 13, 2001).
Narten et al., "Privacy Extensions for Stateless Address Autoconfiguration in IPv6," RFC 3041, pp. 1-16 (Jan. 2001).
Faltstrom, "E.164 Number and DNS," RFC 2916, pp. 1-10 (Sep. 2000).
Vaha-Sipila, "URLs for Telephone Calls," RFC 2806, pp. 1-20 (Apr. 2000).
Aboba et al., "The Network Access Identifier," RFC 2486, pp. 1-8 (Jan. 1999).
Calhoun et al., "Diameter Proxy Server Extensions," IETF Working Draft, draft-calhoun-diameter-proxy-01.txt (Aug. 1, 1998).
Berners-Lee et al., "Uniform Resource Identifiers (URI): Generic Syntax," RFC 2396, pp. 1-38 (Aug. 1998).
Tekelec, "Eagle® Feature Guide," P/N 910-1225-01 (Jan. 1998).
Jalava, "Service Routing in 3GPP IP Multimedia Subsystem," Nokia, pp. 1-16 (Publication Date Unknown).
Calhoun et al., "Diameter Base Protcol," Network Working Group, RFC 3588 (Sep. 2003).
Notification of Transmitaal of the International Search Report and the Written Opinion of the International Searching Authority, or the Declaration for International Patent Application No. PCT/US2012/027281 (Jun. 15, 2012).

Notification of Transmittal of the International Search Report and the Written Opinion of the International Searching Authority, or the Declaration for International Application No. PCT/US2012/027263 (Jun. 14, 2012).
Notification of Transmittal of the Internation Search Report and the Written Opinion of the International Searching Authority, or the Declaration for International Patent Application No. PCT/US2012/027736 (Jun. 12, 2012).
Notification of Transmittal of the Internation Search Report and the Written Opinion of the International Searching Authority, or the Declaration for International Patent Application No. PCT/US2012/023971 (Jun. 11, 2012).
Notification of Transmittal of the Internation Search Report and the Written Opinion of the International Searching Authority, or the Declaration for International Patent Application No. PCT/US2012/027269 (Jun. 11, 2012).
Commonly Assigned, Co-pending International Application No. PCT/US12/27736 for "Methods, Systems, and Computer Readable Media for Enriching a Diameter Signaling Message", (Unpublished, filed Mar. 5, 2012).
Commonly Assigned Co-pending U.S. Appl. No. 13/412,352 titled "Methods, Systems, and Computer Readable Media for Enriching a Diameter Signaling Message," (unpublished, filed Mar. 5, 2012).
Commonly Assigned, Co-pending International Application No. PCT/US12/27269 for "Methods, Systems, and Computer Readable Media for Dynamically Learning Diameter Binding Information", (Unpublished, filed Mar. 1, 2012).
Commonly Assigned Co-pending U.S. Appl. No. 13/409,914 titled "Methods, Systems, and Computer Readable Media for Dynamically Learning Diameter Binding Information," (unpublished, filed Mar. 1, 2012).
Commonly Assigned, Co-pending International Application No. PCT/US12/27263 for "Methods, Systems, and Computer Readable Media for Sharing Diameter Binding Data", (unpublished, filed Mar. 1, 2012).
Commonly Assigned, Co-pending U.S. Appl. No. 13/409,893 for "Methods, Systems, and Computer Readable Media for Sharing Diameter Binding Data", (Unpublished, filed Mar. 1, 2012).
Notification of Transmittal of the International Search Report and the Written Opinion of the International Searching Authority, or the Declaration for International Application No. PCT/US2011/039285 (Feb. 9, 2012).
Commonly Assigned, Co-pending International Application No. PCT/US12/23971 for "Methods, Systems, and Computer Readable Media for Provisioning A Diameter Binding Repository", (Unpublished, filed Feb. 6, 2012).
Commonly Assigned Co-pending U.S. Appl. No. 13/366,928 titled "Methods, Systems, and Computer Readable Media for Provisioning A Diameter Binding Repository," (unpublished, filed Feb. 6, 2012).
Notification of the Transmittal of the International Search Report and the Written Opinion of the International Searching Authority, or the Declaration for International Application No. PCT/2010/061934 (Oct. 25, 2011).
"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 10)," 3GPP TS 29.272. V10.2.0. pp. 1-95 (Mar. 2011).
3GPP, "3rd Generation Partnership Project; Technical Specification Group Services and System Aspects; Policy and Charging Control Architecture (Release 11)," 3GPP TS 23.203 V11.0.1, pp. 1-137 (Jan. 2011).
"3rd Generation Partnership Project; Technical Specification Group Services and System Aspects; Telecommunication management; Charging management; Diameter charging applications (Release 9)," 3GPP TS 32,299, V9.4.0 (Jun. 2010).
"3rd Generation Partnership Project; Technical Specification Group Services and System Aspect; Telecommunication management; Charging management; Charging architecture and principles (Release 9)," 3GPP TS 32.240, V9.1.0 (Jun. 2010).
Znaty, "Diameter, GPRS, (LTE + ePC = EPS), IMS, PCC and SDM," Effort, pp. 1-229 (Part 1 of 2) (May 2010).

(56) References Cited

OTHER PUBLICATIONS

Znaty, "Diameter, GPRS, (LTE + ePC = EPS), IMS, PCC and SDM," EFORT pp. 230-461 (Part 2 of 2) (May 2010).
3GPP, "3rd Generation Partnership Project; Technical Specification Group Core Network and Terminals; Policy and Charging Control signalling flows and Quality of Service (QoS) parameter mapping (Release 9)," 3Rd Generation Partnership Project, TS 29.213 V9.2.0, pp. 1-129, pp. 1-129 (Mar. 2010).
"3rd Generation Partnership Project; Technical Specification Group Core Network and Terminals; Policy and Charging Control over Gx reference point (Release 9)," 3GPP TS 29.212 v9.2.0 (Mar. 2010).
Non-Final Office Action for U.S. Appl. No. 12/409,914 (Jun. 7, 2013).
Notice of Allowance and Fee(s) Due for U.S. Appl. No. 13/412,352 (May 28, 2013).
Non-Final Office Action for U.S. Appl. No. 13/366,928 (Mar. 26, 2013).
Rouse, "Platform," http://searchservervirtualization.techtarget.com/definition/platform, pp. 1-2 (2006-2009).
Notice of Allowance and Fee(s) Due for U.S. Appl. No. 13/366,928 (Jan. 7, 2013).
Non-Final Office Action for U.S. Appl. No. 13/192,410 (Dec. 20, 2012).
Non-Final Office Action for U.S. Appl. No. 13/409,893 (Dec. 13, 2012).
Commonly-assigned, co-pending U.S. Appl. No. 13/712,481 for "Methods, Systems, and Computer Readable Media for Encrypting Diameter Identification Information in a Communication Network," (Unpublished, filed Dec. 12, 2012).
Calhoun et al., "Diameter Base Protocol,"draft-ietf-aaa-diameter-07, Section 6.3, p. 68 (Jul. 2001).
Non-Final Office Action for U.S. Appl. No. 13/366,928 (Mar. 21, 2014).
Commonly-assigned, co-pending U.S. Appl. No. 14/190,071 for "Methods, Systems, and Computer program Products for Clustering and Communicating Between Internet Protocol Multimedia Subsystem (IMS) Entities and for Supporting Database Access in an IMS Network Environment."
Non-Final Office Action for U.S. Appl. No. 13/192,410 (Feb. 20, 2014).

Advisory Action Before the Filing of an Appeal Brief for U.S. Appl. No. 13/366,928 (Feb. 10, 2014).
Extended European Search Report for European Application No. 10841605.8 (Feb. 3, 2014).
Final of Action for U.S. Appl. No. 13/409,914 (Dec. 30, 2013).
Notification of Publication and Entry into Examination Procedure for Chinese Patent Application No. 201280013938.6 (Dec. 18, 2013).
Communication of European publication number and information on the application of Article 67(3) EPC for European Application No. 12751986.6 (Dec. 11, 2013).
Communication of European publication number and information on the application of Article 67(3) EPC for European Application No. 12751783.7 (Dec. 11, 2013).
Communication of European publication number and information on the application of Article 67(3) EPC for European Application No. 12751812.4 (Dec. 11, 2013).
Communication of European publication number and information on the application of Article 67(3) EPC for European Application No. 12741984.4 (Nov. 13, 2013).
Declaration of Mark Kanode for U.S. Appl. No. 13/409,893 (Nov. 1, 2013).
Advisory Action for U.S. Appl. No. 13/192,410 (Oct. 24, 2013).
Final Office Action for U.S. Appl. No. 13/366,928 (Oct. 23, 2013).
Applicant-Initiated Interview Summary for U.S. Appl. No. 13/192,410 (Oct. 18, 2013).
Advisory Action Before the Filing of an Appeal Brief for U.S. Appl. No. 13/409,893 (Sep. 13, 2013).
Notice of Allowance and Fee(s) Due for U.S. Appl. No. 12/974,869 (Aug. 19, 2013).
Final Office Action for U.S. Appl. No. 13/192,410 (Aug. 5, 2013).
Final Office Action for U.S. Appl. No. 13/409,893 (Jul. 1, 2013).
"3rd Generation Partnership Project; Technical Specification Group Services and System Aspects; Policy and charging control architecture (Release 9)," 3GPP TS 23.203, V9.3.0 (Dec. 2009).
"Cisco Content Services Gateway—2nd Generation Release 3.5 Installation and Configuration Guide," Chapter 10: Configuring Gx Support, pp. 10-1—10-10, Chapter 11: Configuring Mobile PCC Support, pp. 11-1—11-8, URL: http://www.cisco.com/en/US/docs/wireless/csg2/3.5/installation/guide/csg3-51.pdf (Jun. 5, 2009).

* cited by examiner

METHODS, SYSTEMS, AND COMPUTER READABLE MEDIA FOR HYBRID SESSION BASED DIAMETER ROUTING

PRIORITY CLAIM

This application claims the benefit of U.S. Provisional Patent Application Ser. No. 61/448,044 filed Mar. 1, 2011, the disclosure of which is incorporated herein by reference in its entirety.

TECHNICAL FIELD

The subject matter described herein relates to enhancing Diameter binding records that associate mobile subscribers with network service nodes. More specifically, the subject matter relates to methods, systems, and computer readable media for hybrid session based Diameter routing.

BACKGROUND

At present, problems exist with the assignment of Diameter based network service nodes to Diameter signaling messages associated with a common signaling transaction and/or mobile subscriber. Namely, there are difficulties associated with the identification and correlation of subsequently received Diameter signaling messages to the initially received Diameter signaling message transaction. As a consequence, Diameter signaling messages received at a Diameter routing node may not be forwarded to the same network service node assigned to an existing Diameter signaling message transaction that is associated with a particular mobile subscriber.

Accordingly, a need exists for improved methods, systems, and computer readable media for hybrid session based Diameter routing.

SUMMARY

Methods, systems, and computer readable media for hybrid session based Diameter routing are disclosed. According to one method, the method comprises receiving, at a first Diameter signaling router (DSR), a first Diameter message for processing by a Diameter server. The method also includes selecting, using a Diameter node selection algorithm that operates on at least one parameter in the first Diameter message without requiring use of stored Diameter binding information, a first Diameter server to which the first Diameter message is to be routed. The method further includes determining whether the first Diameter server is available. The method also includes, in response to determining that the first Diameter server is not available, selecting a second Diameter server to which the first Diameter message is to be routed and creating an exception binding record that associates the second Diameter server and information in the first Diameter message.

A system for hybrid session based Diameter routing is also disclosed. The system includes a Diameter binding repository (DBR) and a Diameter routing module (DRM) located at a Diameter signaling router (DSR). The DBR is configured to store Diameter binding records. The DRM is communicatively associated with the communications interface and configured to select, using a Diameter node selection algorithm that operates on at least one parameter in the first Diameter message without requiring use of stored Diameter binding information, a first Diameter server to which the first Diameter message is to be routed, to determine whether the first Diameter server is available, in response to determining that the first Diameter server is not available, to select a second Diameter server to which the first Diameter message is to be routed, and to create an exception binding record that associates the second Diameter server and information in the first Diameter message.

The subject matter described herein may be implemented in software in combination with hardware and/or firmware. For example, the subject matter described herein may be implemented in software executed by a processor. In one exemplary implementation, the subject matter described herein for hybrid session based Diameter routing may be implemented using a non-transitory computer readable medium to having stored thereon executable instructions that when executed by the processor of a computer control the processor to perform steps. Exemplary non-transitory computer readable media suitable for implementing the subject matter described herein include chip memory devices or disk memory devices accessible by a processor, programmable logic devices, and application specific integrated circuits. In addition, a computer readable medium that implements the subject matter described herein may be located on a single computing platform or may be distributed across plural computing platforms.

As used herein, the term "node" refers to a physical computing platform including one or more processors and memory.

As used herein, the terms "function," "engine," or "module" refer to hardware, firmware, or software in combination with hardware and/or firmware for implementing features described herein.

BRIEF DESCRIPTION OF THE DRAWINGS

The subject matter described herein will now be explained with reference to the accompanying drawings of which.

DETAILED DESCRIPTION

Figure 1:
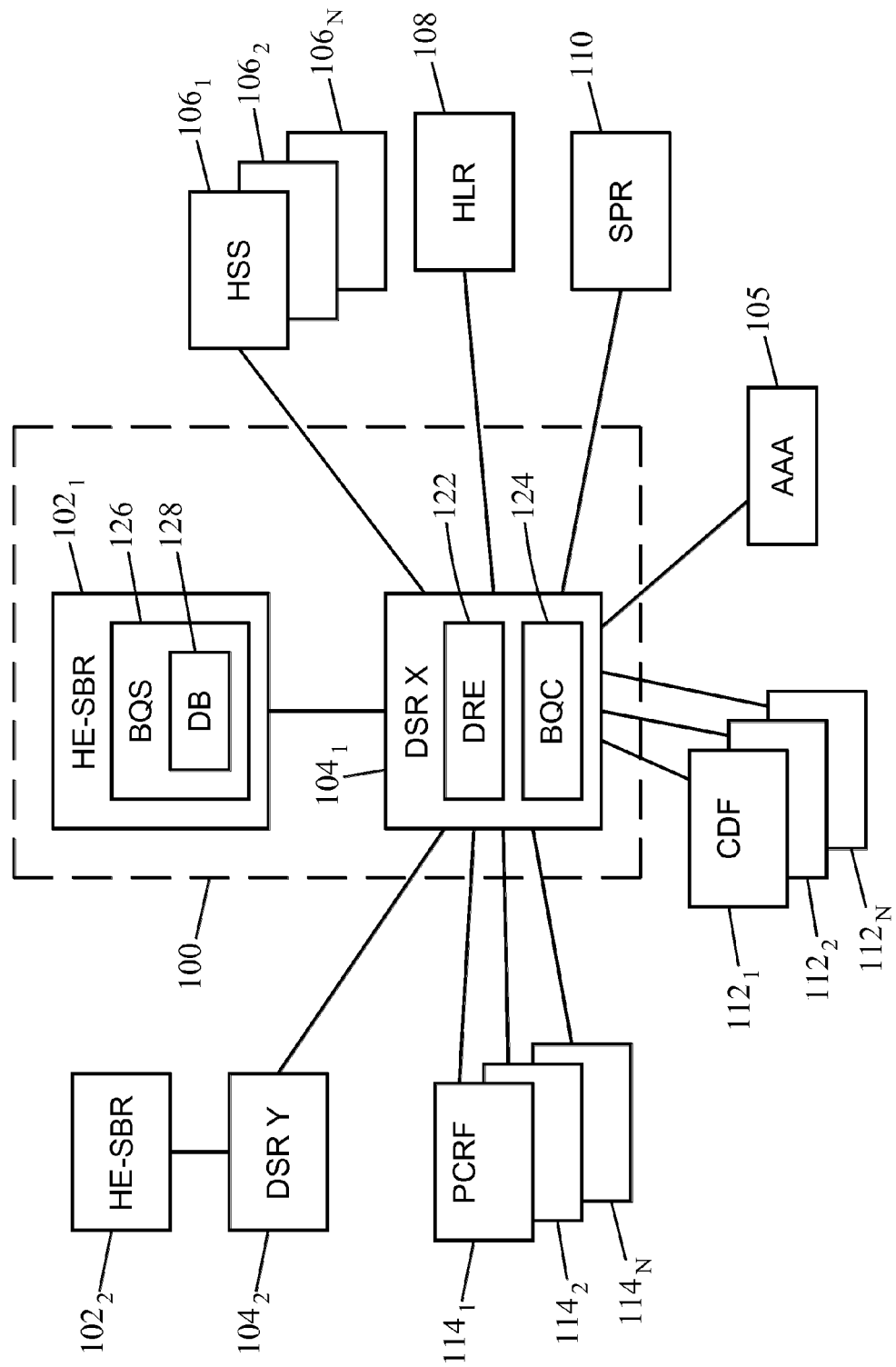
FIG. 1 is a block diagram illustrating a system for hybrid session based Diameter routing according to an embodiment of the subject matter described herein.

The subject matter described herein includes methods, systems, and computer readable media for hybrid session based Diameter routing. As used herein, the term Diameter refers to the authentication, authorization, and accounting (AAA) protocol utilized by telecommunications and computer networks as defined by RFC 3588. In some embodiments, the present subject matter may include a Diameter signaling router (DSR) that receives a Diameter signaling message associated with a particular mobile subscriber. The received Diameter signaling message may require processing from a particular type of network service node, such as a network charging function node (e.g., a charging data function (CDF), a policy and charging rules function (PCRF), etc.) and home subscriber server (HSS), or AAA node. Upon receiving a Diameter signaling message, the DSR may be configured to either assign one of a plurality of network service nodes to process the received Diameter signaling message or determine whether a network service node is already assigned (or "bound") to the mobile subscriber, such as by consulting a binding repository for binding information.

In some embodiments, the DSR may be configured to determine or select an appropriate network service node (e.g., a CDF or PCRF) based on a node selection algorithm, such as a load balancing hashing function (LBHF) that uses information contained in the received Diameter signaling message. The present subject matter may also include a binding repository, such as a hash exceptions session binding repository (HE-SBR), for maintaining exceptions to bindings (e.g., node selections) generated by the selection algorithm. For example, exception binding records may be created when a node different from the node initially selected using a node selection algorithm is to be routed a Diameter signaling message for processing. More particularly, exception binding records may be created when an initially selected node is unusable or not available and, as such, another node is to process Diameter signaling messages that would have been processed by the initially selected node.

Advantageously, the subject matter described herein can be utilized such that the need to maintain state or a binding record for each Diameter session is minimized or avoided. For example, in most scenarios, the present subject matter allows Diameter messages to be load-balanced and/or routed in a "stateless" manner through dynamic use of a node selection algorithm, such as an LBHF. However, in scenarios where a selected destination Diameter node (e.g., CDF, PCRF, etc.) is unusable (e.g., fails or is not available), the present subject matter provides a Diameter binding repository, such as a HE-SBR, for storing exception binding records that associate a Diameter session and/or user and an alternate node (e.g., a node that is different from the node initially selected by the selection algorithm).

Accordingly, the present subject matter may include a hybrid session based routing solution that requires maintaining an exception binding record when a node selection algorithm selects an unavailable or recently unavailable network service node (e.g., a Diameter server) for processing Diameter messages associated with a given subscriber and/or session, but may not require maintaining binding information for every Diameter session or related user. As compared to solutions that require an explicit binding record for each Diameter session, the present subject matter provides a much more efficient solution in terms of processing and storage resource usage. For example, by only storing binding information for exceptional scenarios, a hybrid session based routing solution in accordance with aspects of the present subject matter may use significantly less memory resources than other session-based routing solutions.

Reference will now be made in detail to exemplary embodiments of the subject matter described herein, examples of which are illustrated in the accompanying drawings. Wherever possible, the same reference numbers will be used throughout the drawings to refer to the same or like parts.

FIG. 1 depicts an exemplary system 100 for hybrid session based Diameter routing according to an embodiment of the subject matter described herein. In some embodiments, system 100 may be implemented in a Long Term Evolution (LTE) network, an Internet protocol Multimedia Subsystem (IMS) network, or other networks without departing from the scope of the present subject matter.

System 100 may include one or more Diameter routing nodes, e.g., DSR X $104_1$, configured to receive a Diameter signaling message that is associated with a mobile subscriber. Although FIG. 1 illustrates the use of a DSR, any network node that is configured to route Diameter signaling messages may be utilized without departing from the scope of the subject matter. For example, the network node may also include a Diameter routing agent (DRA), a Diameter proxy agent (DPA), a Diameter relay agent, a Diameter translation agent, and the like.

In some embodiments, DSR X $104_1$ may include a Diameter routing module or engine (DRE) 122 that may be configured to route Diameter signaling messages between various Diameter nodes on various Diameter interfaces including, but not limited to, the Gy, Ro, Rf, S6d, and S6a interfaces. DSR X $104_1$ and/or DRE 122 may also be configured to perform one or more aspects associated with hybrid session based routing as described herein.

Exemplary Diameter based signaling messages received and/or routed by DSR X $104_1$ may include a credit control request (CCR) message, an accounting request (ACR) message, an update location request (ULR) message, a Diameter mobility management message, and a Diameter charging message. In some embodiments, the Diameter based signaling message may be sent to the Diameter routing node by a network node (not shown) such as, for example, a policy and charging enforcement function (PCEF) node, a gateway GPRS support node (GGSN), a mobility management entity (MME), and a public data network (PDN) gateway.

DSR X $104_1$ may also include a binding query client (BQC) 124 that is configured to communicate (e.g., send and receive) Diameter based signaling messages to one or more DBRs (e.g., HE-SBR $102_1$).

In some embodiments, the Diameter signaling message received by DSR X $104_1$ may originally be destined or addressed to a network service node that is capable of processing the Diameter signaling message. For example, a network service node may include a policy and charging rules function (PCRF) node 114, a network charging node (e.g., a charging data function (CDF) 112, a charging trigger function (CTF), a charging gateway function (CGF)), an online charging system (OCS) node, an offline charging system (OFCS) node, a home subscriber server (HSS) 106, a home location register node (HLR) 108, an AAA node 105, a subscriber profile repository 110, and a call session control function (CSCF) node. Although FIG. 1 depicts various network service nodes to which the Diameter signaling message may be routed, any other type of network service node(s) configured for servicing a Diameter signaling message may be utilized in system 100 without departing from the scope of the present subject matter.

DSR X $104_1$ may interact with various subscriber data management (SDM) nodes, such as SPR 110, HSS 106, and HLR 108. An SDM node may be a designated network node configured to store and/or maintain additional mobile subscriber information, such as identifiers and service and policy profile information associated with the mobile subscriber. An SDM node may be queried by DSR X $104_1$ for the additional mobile subscriber information (e.g., identifiers). Other exemplary SDM nodes include PCRF node 114 and a CSCF node.

System 100 may includes one or more Diameter binding repository (DBR), such as an HE-SBR $102_1$, for maintaining various binding records. HE-SBR $102_1$ may include a binding query server (BQS) 126 that hosts a binding database 128. In some embodiments, binding database 128 may be configured to store Diameter binding records that provide associations (e.g., Diameter-related bindings, mappings, links, etc.) of mobile subscriber related identifiers and assigned network service nodes. Exemplary Diameter-related bindings stored by HE-SBR $102_1$ may include, but are not limited to, a Diameter session binding, Diameter session-identifier-to-network service node associations, Diameter end-to-end identifier-to-network service node associations, mobile subscriber identifier-to-network service node associations, charging identifier (e.g., IMS charging ID) to-network service node associations, and the like. In the embodiments illustrated herein, HE-SBR $102_1$ is shown as being a stand-alone entity, such as a network node, a server, an application, a computing platform, or a database that is located separate from the Diameter signaling router. However, HE-SBR $102_1$ may be co-located within a DSR or co-located within any other network node in other embodiments (not shown).

In some embodiments, a network may include multiple modules or nodes (e.g., DSR Y $104_2$ and HE-SBR $102_2$) having similar functionality to those described above. In such embodiments, each module or node may be may be communicatively connected with other similar nodes or modules. For example, as shown in FIG. 1, DSR X $104_1$ or HE-SBR $102_1$ may be configured to communicate with DSR Y $104_2$ or HE-SBR $102_2$. In some other embodiments, multiple DSRs may be communicatively connected to a centralized HE-SBR or other binding repository. By allowing such communications, multiple DSRs may use binding information derived from a particular DSR for routing Diameter messages.

Figure 2:
FIG. 2 is an exemplary table depicting Diameter binding record data according to an embodiment of the subject matter described herein.

FIG. 2 illustrates an exemplary table 200 depicting Diameter binding record data according to an embodiment of the subject matter described herein. In some embodiments, table 200 may represent at least a portion of database 128 maintained at HE-SBR 102. Table 200 may include a plurality of mobile subscriber related identifiers 202-218 as column headers. For example, table 200 may include at least one column for each of: a Diameter session identifier 202, a user name 204, an IMPI identifier 208, an IMPU identifier 210, a SIP URI 212, an NAI 214, a mobile or dialable (mobile/dialable) number 216, and a user IP address 218, and access point name (APN) 220. Table 200 may also include a network service node column, such as a CDF identifier/address column 222. Table 200 may further include a time to live (TTL) column 224 for indicating how long a binding record is to be maintained or, in other words, indicating when a binding record is to be discarded. Although eleven columns are depicted in FIG. 2, table 200 may include any number of columns associated with any type of identifier.

In some embodiments, Diameter binding record data may be used in determining, identifying, and/or selecting a network service node, e.g., to process a particular Diameter transaction or related Diameter messages. For example, Diameter binding record data may be used to route transactions associated with a particular user as identified by an IMSI value to a particular HSS as identified by an HSS identifier.

In some embodiments, an HE-SBR or DSR may be configured to provision table 200. For example, DSR X $104_1$ may send a provisioning message to HE-SBR $102_1$. Upon receiving a provisioning message that contains Diameter binding record information (e.g., message 204 in FIG. 2), HE-SBR $102_1$ may add a new Diameter binding record to table 200. In this example, if HE-SBR $102_1$ received a provisioning message that contained Diameter biding record information that included a Diameter session identifier of "678", a SIP URI of "ttt", and a user IP address of "ZZZ" associated with "CDF 1", then HE-SBR $102_1$ may add the new Diameter binding record represented as the last line of table 200.

Figure 3:
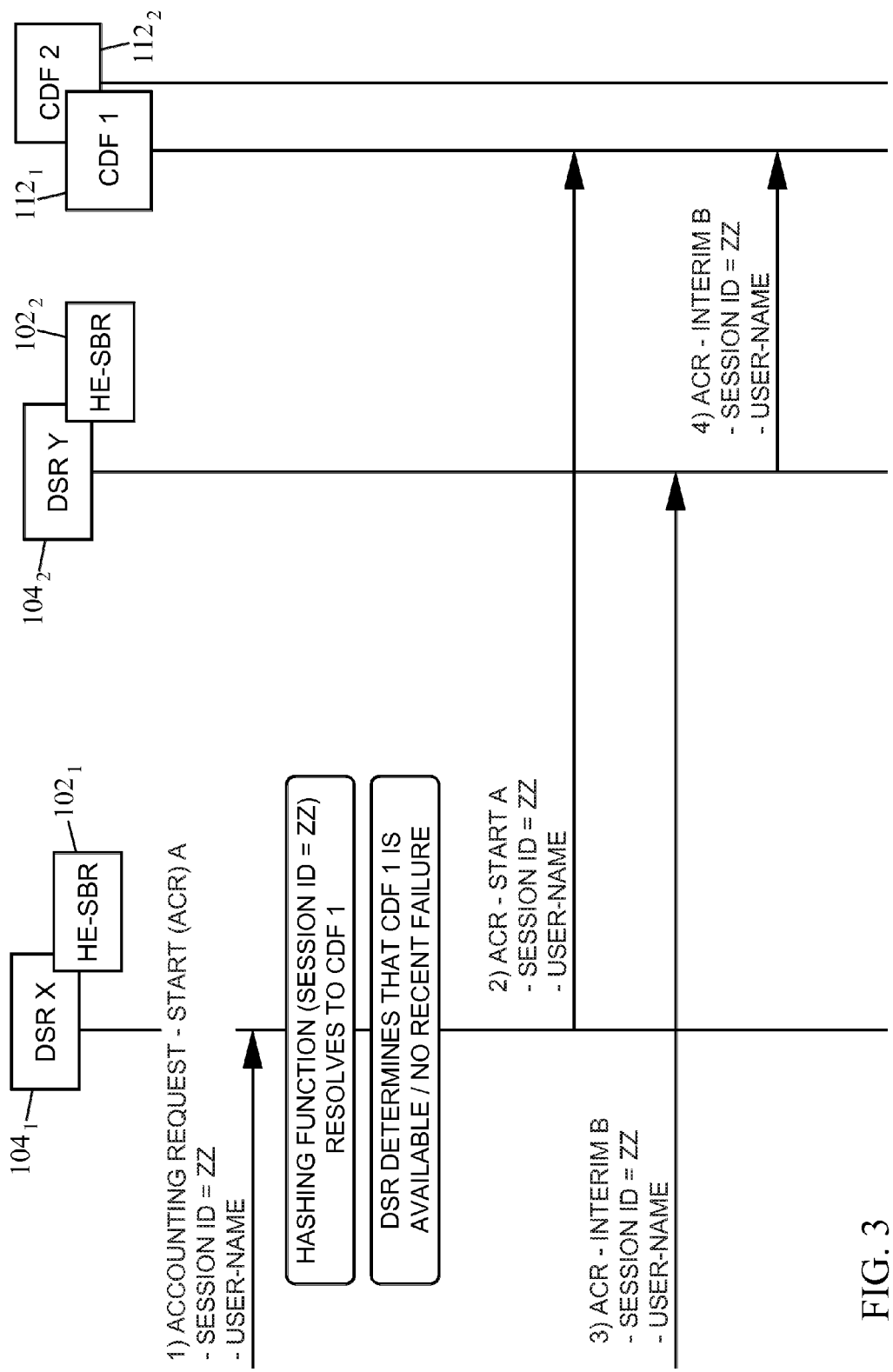
FIG. 3 is a message sequence diagram illustrating routing Diameter signaling messages using binding information according to an embodiment of the subject matter described herein.

FIG. 3 is a message sequence diagram illustrating routing Diameter signaling messages using binding information according to an embodiment of the subject matter described herein. In this embodiment, DSR X $104_1$ and DSR Y $104_2$ may be configured to employ identical or substantially similar LBHFs or other selection algorithms. For example, DSR X $104_1$ or DSR Y $104_2$ may use identical hashing functions such that related Diameter messages are routed to the same destination node regardless of which DSR receives it.

Referring to FIG. 3, in step 1, a Diameter accounting request (ACR) start message "A" for processing by a CDF (e.g., CDF 1 $112_1$ or CDF 2 $112_2$) may be received by DSR X $104_1$. In some embodiments, the ACR start message may indicate the start of an accounting or Diameter charging session and/or may be the first message of a particular Diameter transaction. The ACR start message may include a session identifier and a user identifier. For example, the ACR start message may include a Diameter session ID value of "ZZ" and a user name.

In some embodiments, after receiving the ACR start message, DSR X $104_1$ may execute a Diameter node selection algorithm for selecting one of CDFs $112_{1-2}$. For example, DSR X $104_1$ may utilize an LBHF (e.g., a software module executed by a hardware processor in DSR X $104_1$) or other selection algorithm that when executed selects one CDF (e.g., CDF 1 $112_1$) from the plurality of CDFs $112_{1-2}$ to process the received ACR start message. The LBHF or selection algorithm may use various methods and/or factors for selecting an appropriate HSS. Exemplary selection methods may include one or more of: random selection, round-robin selection, load-based selection, user-based selection, session-based selection, location-based selection, and network-based selection.

In some embodiments, an LBHF may use a session identifier and/or a subscriber identifier to generate a hash output that indicates a particular node. For example, DSR X $104_1$ may use information contained in the ACR start message (e.g., a session identifier) as input for an LBHF. Other exemplary inputs that may be used include the number of available CDF nodes, a network or location identifier, a congestion indicator, a time of day, a priority indicator, and a service type. After providing one or more inputs, an LBHF may generate a hash output that directly or indirectly identifies to which of CDF 1 $112_1$ or CDF 2 $112_2$ the ACR start message should be routed. For example, as shown in FIG. 3, the LBHF output may indicate that the ACR start message should be routed to CDF 1 $112_1$.

In some embodiments, after receiving the ACR start message and prior to selecting a first Diameter server using a Diameter node selection algorithm, DSR X $104_1$ may consult a binding repository (e.g., HE-SBR $112_1$) for an existing binding record that indicates to which node the first Diameter message is to be routed. If an existing binding record is found, DSR X $104_1$ may route the first Diameter message to the node indicated by the existing binding record (e.g., without using a node selection algorithm). If an existing binding record is not found, DSR X $104_1$ may select a node using a node selection algorithm.

In some embodiments, before routing the ACR start message, DSR X $104_1$ may determine whether CDF 1 $112_1$ is available (e.g., usable to successfully process the message). For example, confirming whether a node can successfully process a Diameter message may include determining that a node is currently available, that the node has not recently recovered from a failure, that the node includes or has access to pertinent information, and/or that the node has not recently been brought into service.

Various methods may be used to determine whether a node is available. For example, DSRs 104 may periodically or aperiodically send probing messages to HE-SBRs 102 for determining availability. In another example, HE-SBRs 102 may periodically or aperiodically send alive or heartbeat messages to DSRs 104 for indicating availability. In yet another example, DSRs 104 may query a database, such as a network management system (NMS) database, for determining whether a node is usable to successfully process the message.

In step 2, the ACR start message may be routed to CDF 1 $112_1$, as determined by an LBHF or other selection algorithm. After receiving the ACR start message, CDF 1 $112_1$ may process the message and respond back with an accounting answer (ACA) message (not shown).

In step 3, a Diameter ACR interim message "B" for processing by a CDF (e.g., CDF 1 $112_1$ or CDF 1 $112_2$) may be received by DSR Y $104_2$. In some embodiments, the ACR interim message may indicate the updating of an existing accounting session and/or may be a non-initial message (e.g., subsequent to an ACR start message) of a particular Diameter transaction. The ACR interim message may include a session identifier and a user identifier. For example, the ACR interim message may include a Diameter session ID value of "ZZ" and a user name.

After receiving the ACR interim message, DSR Y $104_2$ may execute a node selection algorithm for selecting one of CDFs $112_{1-2}$. As stated above, DSR Y $104_2$ may include identically or substantially similar selection algorithms as other DSRs in the network, including DSR X $104_1$. For example, DSR Y $104_2$ and DSR X $104_1$ may implement identical LBHFs. DSR Y $104_2$ may use information contained in the ACR interim message (e.g., a session identifier) as input for an LBHF. In such an example, if the LBHF of DSR Y $104_2$ uses the same input as the LBHF of DSR X $104_1$ described above used to indicate a particular destination, the LBHF output of DSR Y $104_2$ may indicate the same destination (e.g., CDF 1 $102_1$).

In step 4, the ACR interim message may be routed to CDF 1 $112_1$, as determined by an LBHF or other selection algorithm. After receiving the ACR interim message, CDF 1 $112_1$ may process the message and respond back with an ACA message (not shown).

While FIG. 3 depicts ACR messages, it will be appreciated that various Diameter messages, such as credit control request (CCR) and credit control answer (CCA) messages, and various network service nodes, such as HSSs 112 or PCRFs 114, may be used without departing from the scope of the present subject matter.

Figure 4A:
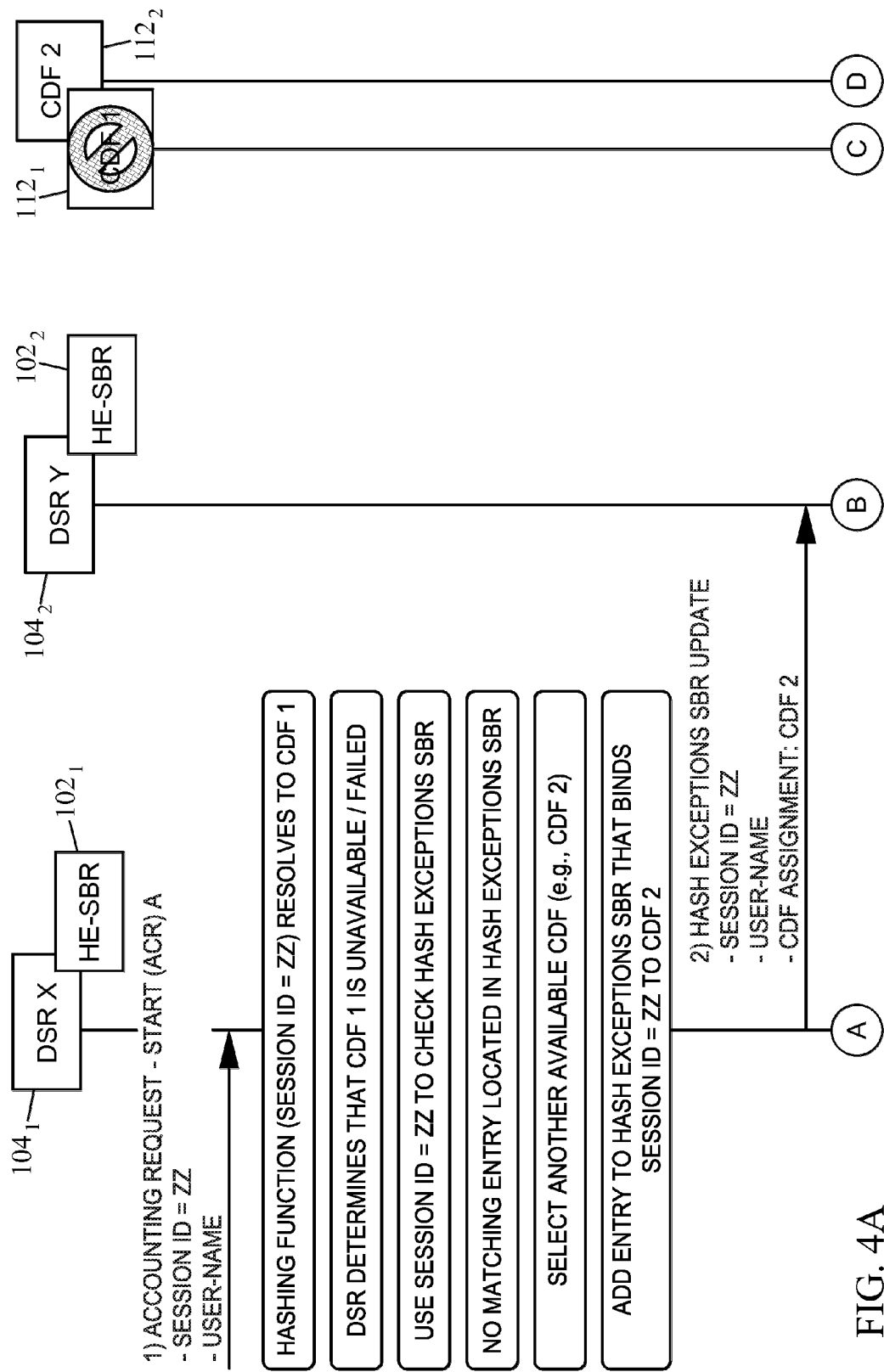
FIGS. 4A and 4B are portions of a message sequence diagram illustrating routing Diameter signaling messages using exception binding information according to an embodiment of the subject matter described herein.
Figure 4B:
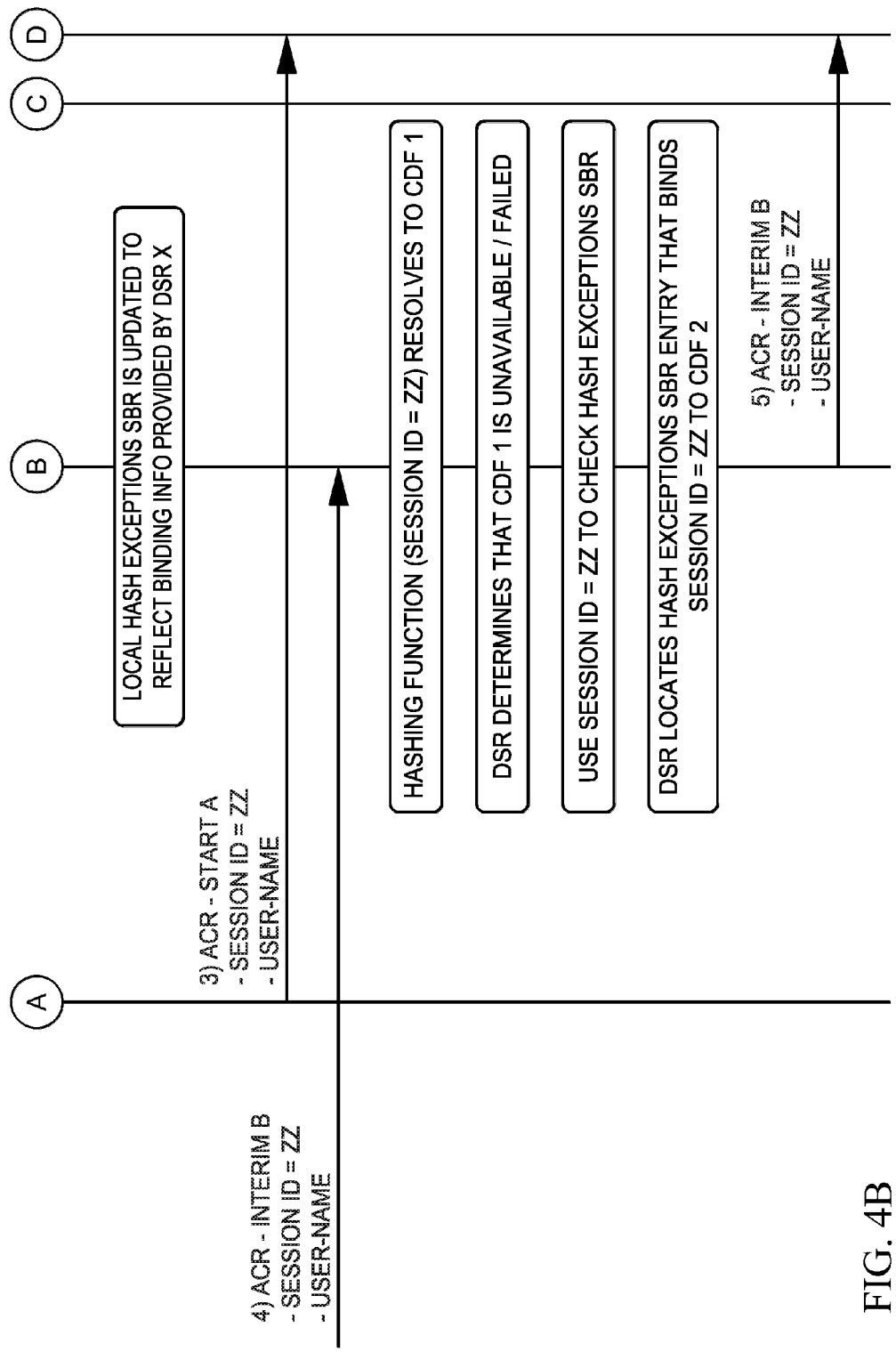

FIGS. 4A and 4B are portions of a message sequence diagram illustrating routing Diameter signaling messages using exception binding information according to an embodiment of the subject matter described herein. In this embodiment, DSR X $104_1$ and DSR Y $104_2$ may be configured to employ identical or substantially similar selection algorithms and may be configured to consult a local HE-SBR for exception binding information if a selected CDF is not available.

Referring to FIG. 4A, in step 1, a Diameter ACR start message "A" for processing by a CDF (e.g., CDF 1 $112_1$ or CDF 2 $112_2$) may be received by DSR X $104_1$. The ACR start message may include a session identifier and a user identifier. For example, the ACR start message may include a Diameter session ID value of "ZZ" and a user name.

In some embodiments, after receiving the ACR start message, DSR X $104_1$ may execute a node selection algorithm for selecting one of CDFs $112_{1-2}$. After providing one or more inputs, an LBHF may generate a hash output that that directly or indirectly identifies to which of CDF 1 $112_1$ or CDF 2 $112_2$ the ACR start message should be routed. For example, as shown in FIG. 4A, the LBHF output may indicate that the ACR start message should be routed to CDF 1 $112_1$.

In some embodiments, before routing the ACR start message, DSR X $104_1$ may determine whether CDF 1 $112_1$ is available. If it is determined that CDF 1 $112_1$ is available, DSR X $104_1$ may route the message to the selected node. If it is determined that CDF 1 $112_1$ is not available, DSR X $104_1$ may consult or query HE-SBR $102_1$ for relevant binding information, such as an exception binding record. For example, an exception binding record may indicate an alternate node that can successfully process the Diameter message.

In some embodiments, consulting HE-SBR $102_1$ may include using information from a received Diameter message as a key or input in a query or lookup procedure. For example, a session identifier from the ACR start message may be used as a lookup criterion for identifying relevant binding information in HE-SBR $102_1$. If an HE-SBR entry or record matches the lookup criterion, the binding information may be obtained and used by DSR X $104_1$ in routing the Diameter message.

In some embodiments, if no relevant binding information is found or available, a different or alternate CDF (e.g., CDF 1 $112_2$) may be selected. Selecting an alternate CDF may be performed using various techniques. For example, DSR X $104_1$ may use a same selection algorithm used to select the initial CDF but may provide additional and/or different information as input (e.g., by modifying the session identifier or other parameter that is used as an input in an LBHF). In another example, DSR X $104_1$ may use a different selection algorithm to select another CDF (e.g., CDF 2 $112_2$).

In some embodiments, prior to routing the Diameter start message to an alternate destination, DSR X $104_1$ may determine whether CDF 2 $112_2$ is available. In some other embodiments, the selection algorithm used to select an alternate CDF may remove or exclude unavailable CDFs from being selected.

After selecting an alternate destination, DSR X $104_1$ may store or initiate storing binding information in HE-SBR $102_1$. For example, DSR X $104_1$ may create an exception binding record which associates the session identifier of the ACR start message and CDF 2 $112_2$. In some embodiments, an exception binding record may include other information extracted or derived from the Diameter ACR start message or obtained from entities (e.g., SDM nodes) in the network. The binding record may be stored in HE-SBR $102_1$, e.g., using an update or provisioning message.

In some embodiments, DSR X $104_1$ or HE-SBR $102_1$ may communicate exception binding information to one or more DSRs and/or HE-SBRs in the network. For example, after storing exception binding information in local HE-SBR $102_1$, DSR X $104_1$ may provide the record to a DSR Y $104_2$, which may its local hashing exception SBR. In some embodiments where a centralized HE-SBR maintains binding information, there may be no need to communicate binding information directly to additional DSRs.

In step 2, an HE-SBR update message may be sent from DSR X 104₁ to DSR Y 102₂. The HE-SBR update message may include a session identifier, a user identifier, and/or other information. The HE-SBR update message may include a binding record or indicate a binding association between message related information (e.g., a session identifier) and a CDF (e.g., CDF 2 112₂).

After receiving the HE-SBR update message, DSR Y 104₂ may store or initiate storing binding information in HE-SBR 102₂. For example, as shown in FIG. 4B, HE-SBR 102₂ may be updated to reflect binding information provided by DSR X 104₁.

In step 3, the ACR start message may be routed to CDF 2 112₂, as determined by an LBHF or other selection algorithm. After receiving the ACR start message, CDF 2 112₂ may process the message and respond back with an ACA message (not shown).

In step 4, a Diameter ACR interim message "B" for processing by a CDF (e.g., CDF 1 112₁ or CDF 2 112₂) may be received by DSR Y 104₂. The ACR interim message may include a session identifier and a user identifier. For example, the ACR interim message may include a Diameter session ID value of "ZZ" and a user name.

After receiving the ACR interim message, DSR Y 104₂ may execute a node selection algorithm for selecting one of CDFs 112₁₋₂. As stated above, DSR Y 104₂ may include identically or substantially similar selection algorithms as other DSRs in the network, including DSR X 104₁. For example, as shown in FIG. 4B, a hashing function may use a session identifier from the ACR interim message as input. The hashing function may indicate that CDF 1 112₁ should process the message.

DSR Y 104₂ may determine whether CDF 1 112₁ is available. If it is determined that CDF 1 112₁ is not available, DSR Y 104₂ may consult or query HE-SBR 102₂ for relevant binding information, such as an exception binding record. For example, a session identifier from the ACR interim message may be used as a lookup criterion for identifying relevant binding information in HE-SBR 102₂. In this example, an HE-SBR entry (e.g., derived from binding information provided by DSR X 104₁) that matches the lookup criterion may be located. The entry may indicate a binding between the session identifier of the ACR interim message and CDF 2 112₂. DSR Y 104₂ may use the binding information to route the ACR interim message.

In step 5, the ACR interim message may be routed from DSR Y 104₂ to CDF 2 112₂, as indicated by the stored binding information. After receiving the ACR interim message, CDF 2 112₂ may process the message and respond back with an ACA message (not shown).

While FIGS. 4A and 4B depict ACR messages, it will be appreciated that various Diameter messages, such as credit control request (CCR) and credit control answer (CCA) messages, and various network service nodes, such as HSSs 112 or PCRFs 114, may be used without departing from the scope of the present subject matter.

Figure 5A:
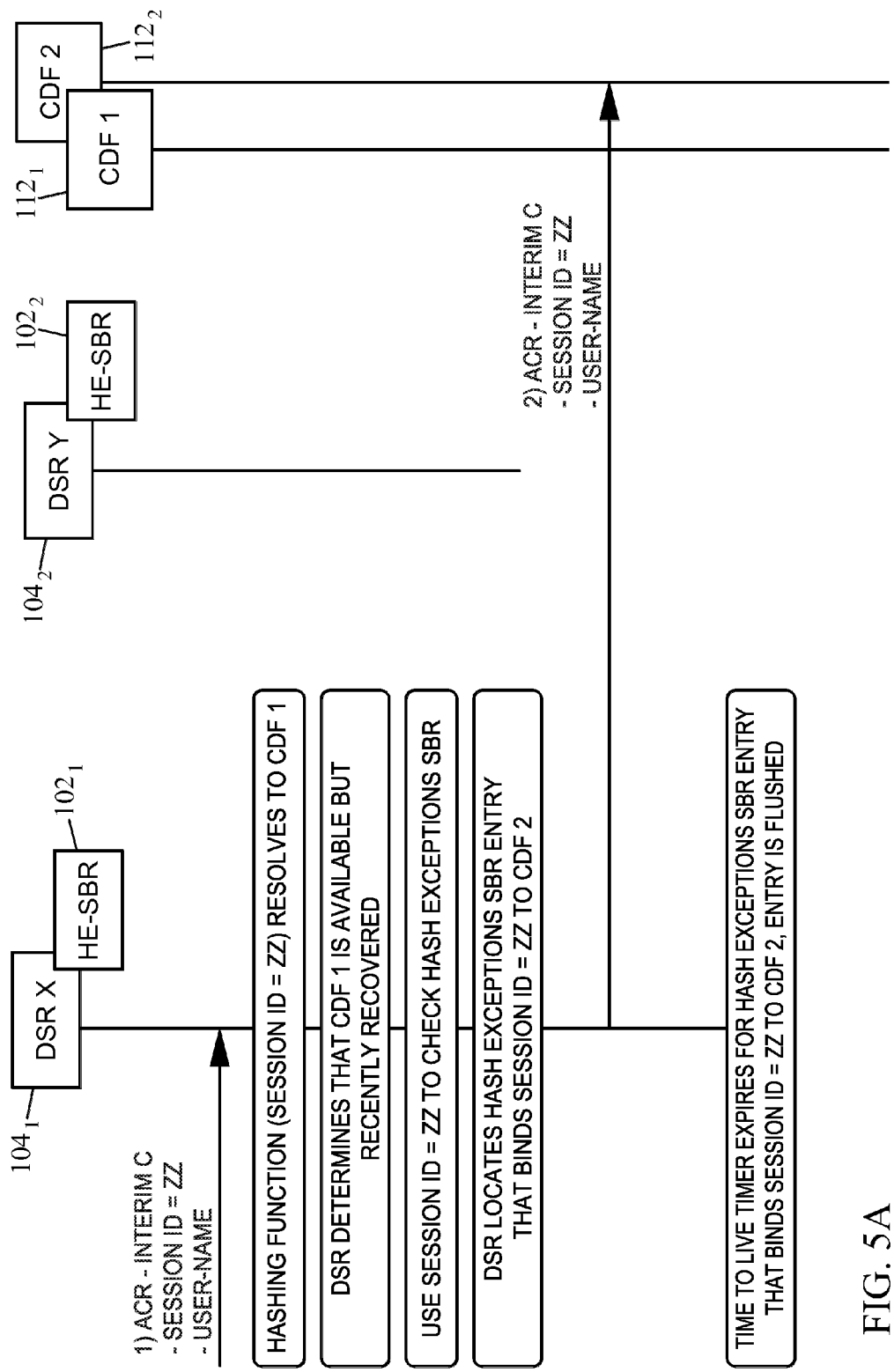
FIG. 5A is a message sequence diagram illustrating routing a Diameter signaling message after a node has recently recovered according to an embodiment of the subject matter described herein.

FIG. 5A is a message sequence diagram illustrating routing a Diameter signaling message after a node has recently recovered according to an embodiment of the subject matter described herein. In this embodiment, DSR X 104₁ and DSR Y 104₂ may be configured to route Diameter signaling traffic away from a previously failed, but recently recovered Diameter node (e.g., CDF, PCRF, etc.) for a predetermined period of time after Diameter node recovery or until messages of a predetermined type (e.g., ACR-Stop, ACR-Start, CCR-Initial, CCR-Terminate) are detected. For example, DSR X 104₁ may continue to route Diameter messages to an alternate node even after an originally selected node is recovered when it is not desirable to move traffic back to the originally selected node, e.g., when overhead or network congestion associated with such a switchover may be problematic.

Referring to FIG. 5A, in step 1, a Diameter ACR interim message "C" for processing by a CDF (e.g., CDF 1 112₁ or CDF 2 112₂) may be received by DSR X 104₁. The ACR interim message may include a session identifier and a user identifier. For example, the ACR interim message may include a Diameter session ID value of "ZZ" and a user name.

After receiving the ACR interim message, DSR X 104₁ may execute a node selection algorithm for selecting one of CDFs 112₁₋₂. For example, as shown in FIG. 5A, a hashing function may use a session identifier from the ACR interim message as input. The hashing function may indicate that CDF 1 112₁ should process the message.

DSR X 104₁ may determine whether CDF 1 112₁ is available. In some embodiments, DSR X 104₁ may determine that CDF 1 112₁ is available, but has recently recovered from a fault, outage, or other problem. After determining CDF 1 112₁ has recently recovered, DSR X 104₁ may consult or query HE-SBR 102₁ for relevant binding information, such as an exception binding record. For example, a session identifier from the ACR interim message may be used as a lookup criterion for identifying relevant binding information in HE-SBR 102₂. In this example, an HE-SBR entry that matches the lookup criterion may be located. The entry may indicate a binding or association between the session identifier of the ACR interim message and CDF 2 112₂. DSR X 104₁ may use the binding information to route the ACR interim message.

In step 2, the ACR interim message may be routed from DSR X 104₁ to CDF 2 112₂, as indicated by the stored binding information. After receiving the ACR interim message, CDF 2 112₂ may process the message and respond back with an ACA message (not shown).

In some embodiments, stored binding information may be associated with a TTL value and may be flushed when the TTL value is reached or exceeded. For example, as shown in FIG. 5A, a TTL value may be associated with a binding record or HE-SBR entry. When a TTL time expires for the HE-SBR entry, the entry may be flushed from HE-SBR 102₁. In some embodiments, where multiple HE-SBRs contain a copy of the entry, the entry may be flushed by each HE-SBR.

While FIG. 5A depicts ACR messages, it will be appreciated that various Diameter messages, such as credit control request (CCR) and credit control answer (CCA) messages, and various network service nodes, such as HSSs 112 or PCRFs 114, may be used without departing from the scope of the present subject matter.

Figure 5B:
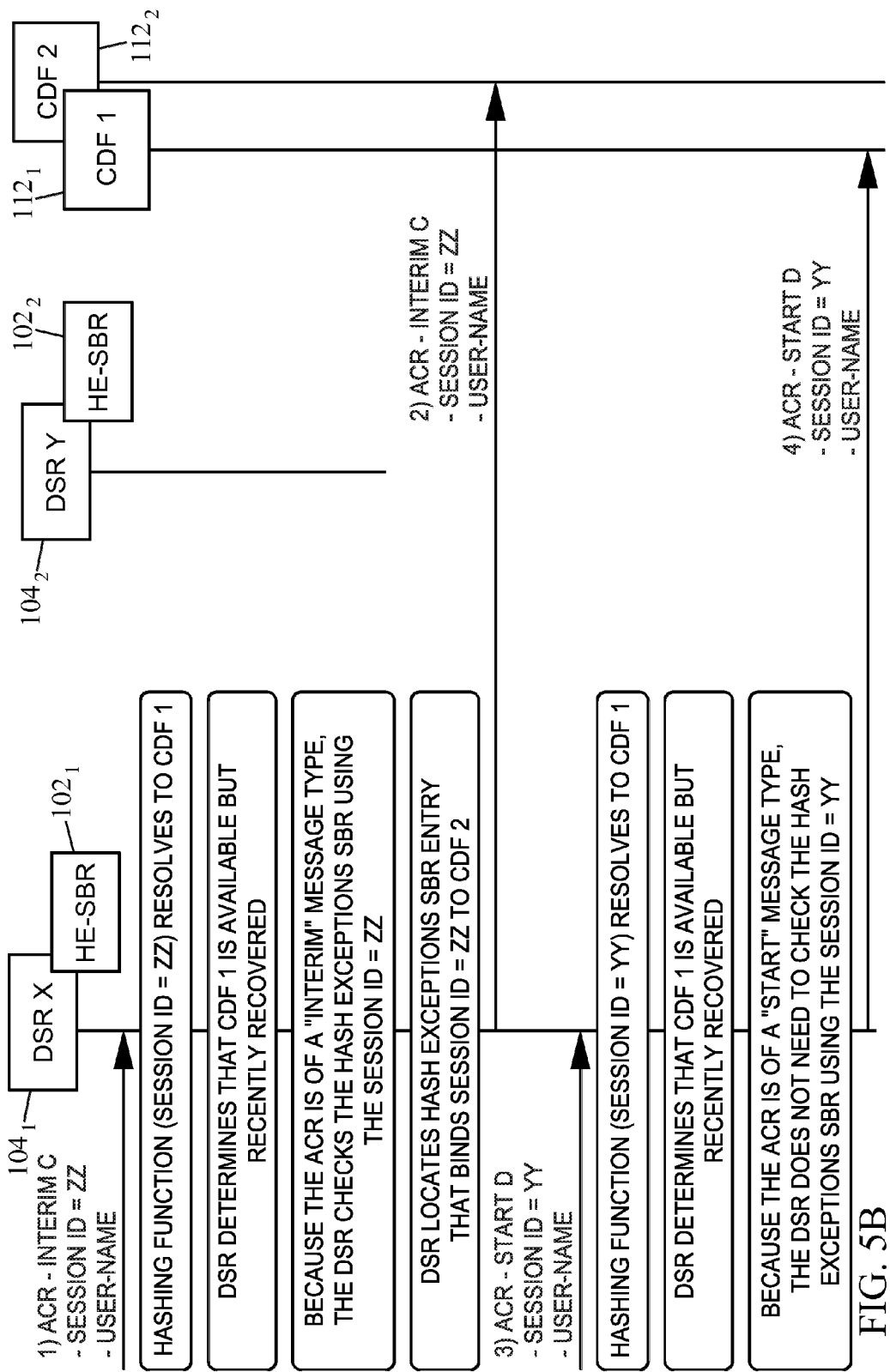
FIG. 5B is a message sequence diagram illustrating routing Diameter signaling messages after a node has recently recovered according to another embodiment of the subject matter described herein.

FIG. 5B is a message sequence diagram illustrating routing Diameter signaling messages after a node has recently recovered according to another embodiment of the subject matter described herein. In this embodiment, DSR X 104₁ and DSR Y 104₂ may be configured to route Diameter signaling traffic away from a previously failed, but recently recovered Diameter node for a predetermined period of time after Diameter node recovery or until messages of a predetermined type are detected.

Referring to FIG. 5B, in step 1, a Diameter ACR interim message "C" for processing by a CDF (e.g., CDF 1 112₁ or CDF 2 112₂) may be received by DSR X 104₁. The ACR interim message may include a session identifier and a user identifier. For example, the ACR interim message may include a Diameter session ID value of "ZZ" and a user name.

After receiving the ACR interim message, DSR X 104₁ may execute a node selection algorithm for selecting one of CDFs 112₁₋₂. For example, as shown in FIG. 5A, a hashing function may use a session identifier from the ACR interim message as input. The hashing function may indicate that CDF 1 112$_1$ should process the message.

DSR X 104$_1$ may determine whether CDF 1 112$_1$ is available. In some embodiments, DSR X 104$_1$ may determine that CDF 1 112$_1$ is available, but has recently recovered from a fault, outage, or other problem.

After determining CDF 1 112$_1$ has recently recovered, DSR X 104$_1$ may glean, observe, or obtain a message type about the received Diameter message. Using this message type information, DSR X 104$_1$ may determine how to proceed. For example, as shown in FIG. 5B, if the ACR message is of an "interim" message, DSR X 104$_1$ may consult or query HE-SBR 102$_1$ for relevant binding information, e.g., since it is likely that a relevant exception binding record exists for this particular Diameter session. In this example, a relevant HE-SBR entry may be located. The entry may indicate a binding or association between the session identifier of the ACR interim message and CDF 2 112$_2$. DSR X 104$_1$ may use the binding information to route the ACR interim message.

In step 2, the ACR interim message may be routed from DSR X 104$_1$ to CDF 2 112$_2$, as indicated by the stored binding information. After receiving the ACR interim message, CDF 2 112$_2$ may process the message and respond back with an ACA message (not shown).

In step 3, a Diameter ACR start message "D" for processing by a CDF (e.g., CDF 1 112$_1$ or CDF 2 112$_2$) may be received by DSR X 104$_1$. The ACR start message may include a session identifier and a user identifier. For example, the ACR interim message may include a Diameter session ID value of "YY" and a user name.

After receiving the ACR start message, DSR X 104$_1$ may execute a node selection algorithm for selecting one of CDFs 112$_{1-2}$. For example, as shown in FIG. 5B, a hashing function may use a session identifier from the ACR interim message as input. The hashing function may indicate that CDF 1 112$_1$ should process the message.

DSR X 104$_1$ may determine whether CDF 1 112$_1$ is available. In some embodiments, DSR X 104$_1$ may determine that CDF 1 112$_1$ is available, but has recently recovered from a fault, outage, or other problem.

After determining CDF 1 112$_1$ has recently recovered, DSR X 104$_1$ may glean, observe, or obtain a message type about the received Diameter message. Using this message type information, DSR X 104$_1$ may determine how to proceed. For example, as shown in FIG. 5B, if the ACR message is of a "start" message, DSR X 104$_1$ may determine that HE-SBR 102$_1$ does not need to be consulted, e.g., since it is unlikely that a relevant exception binding record exists for this new Diameter session.

After determining that HE-SBR 102$_1$ does not need to be consulted, the ACR start message may be routed from DSR X 104$_1$ to recently recovered CDF 1 112$_1$, as indicated by the selection algorithm. After receiving the ACR start message, CDF 1 112$_1$ may process the message and respond back with an ACA message (not shown).

While FIG. 5B depicts ACR messages, it will be appreciated that various Diameter messages, such as credit control request (CCR) and credit control answer (CCA) messages, and various network service nodes, such as HSSs 112 or PCRFs 114, may be used without departing from the scope of the present subject matter.

Figure 5C:
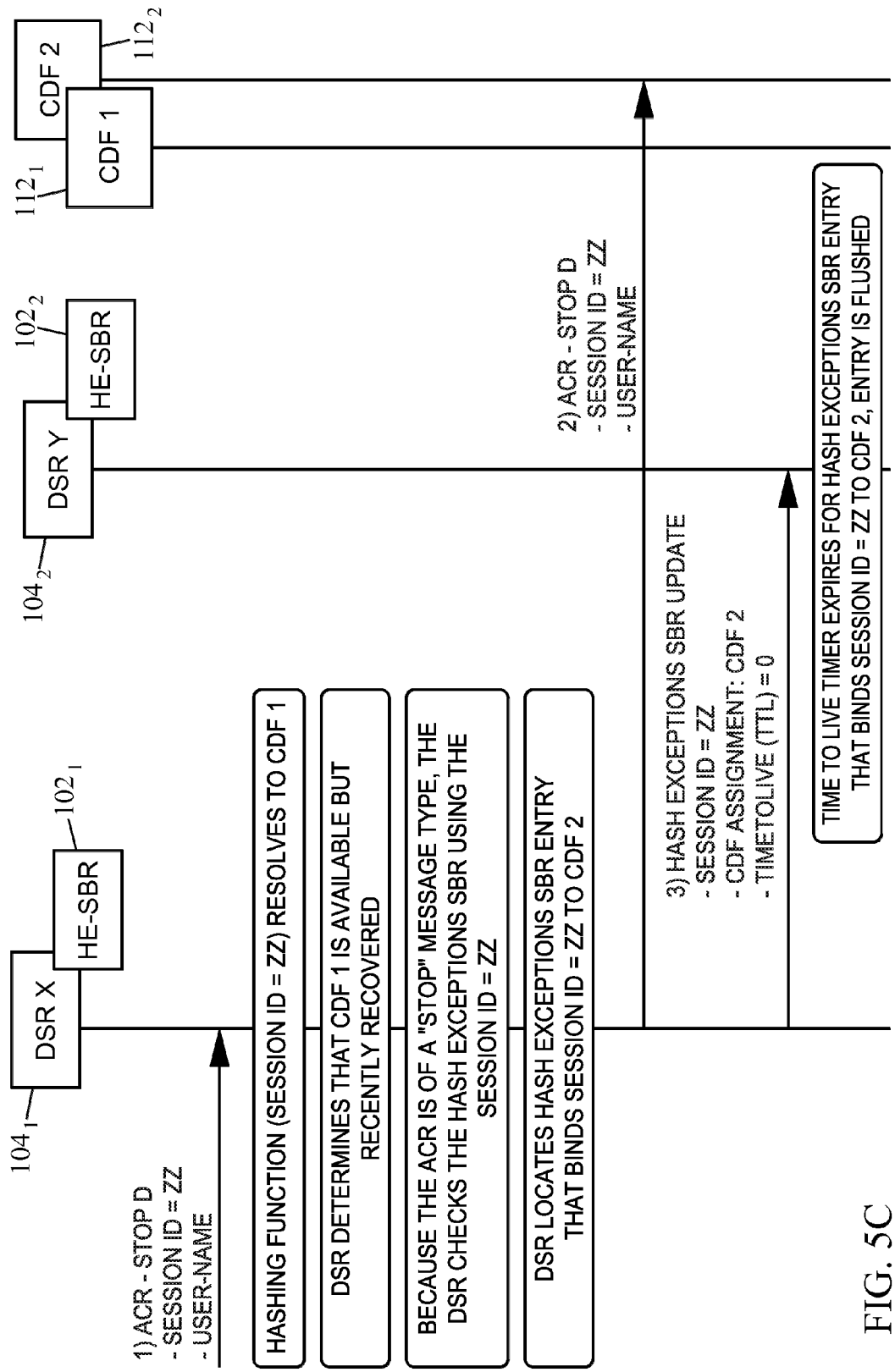
FIG. 5C is a message sequence diagram illustrating routing a Diameter signaling message having a stop event type according to an embodiment of the subject matter described herein.

FIG. 5C is a message sequence diagram illustrating routing a Diameter signaling message having a stop event type according to an embodiment of the subject matter described herein. In this embodiment, DSR X 104$_1$ and DSR Y 104$_2$ may be configured to route Diameter signaling traffic away from a previously failed, but recently recovered Diameter node for a predetermined period of time after Diameter node recovery or until messages of a predetermined type are detected.

Referring to FIG. 5C, in step 1, a Diameter ACR stop message "D" for processing by a CDF (e.g., CDF 1 112$_1$ or CDF 2 112$_2$) may be received by DSR X 104$_1$. In some embodiments, the ACR stop message may indicate the stop of an accounting session and/or may be the last message of a particular Diameter transaction. The ACR stop message may include a session identifier and a user identifier. For example, the ACR interim message may include a Diameter session ID value of "ZZ" and a user name.

After receiving the ACR stop message, DSR X 104$_1$ may execute a node selection algorithm for selecting one of CDFs 112$_{1-2}$. For example, as shown in FIG. 5A, a hashing function may use a session identifier from the ACR stop message as input. The hashing function may indicate that CDF 1 112$_1$ should process the message.

DSR X 104$_1$ may determine whether CDF 1 112$_1$ is available. In some embodiments, DSR X 104$_1$ may determine that CDF 1 112$_1$ is available, but has recently recovered from a fault, outage, or other problem.

After determining CDF 1 112$_1$ has recently recovered, DSR X 104$_1$ may glean, observe, or obtain a message type about the received Diameter message. Using this message type information, DSR X 104$_1$ may determine how to proceed. For example, as shown in FIG. 5B, if the ACR message is of a "stop" message type indicating the end of a Diameter charging session, DSR X 104$_1$ may consult or query HE-SBR 102$_1$ for relevant binding information, e.g., since it is likely that a relevant exception binding record exists for this particular Diameter session.

DSR X 104$_1$ may consult or query HE-SBR 102$_1$ for relevant binding information, such as an exception binding record. A relevant HE-SBR entry may be located. The entry may indicate a binding or association between the session identifier of the ACR stop message and CDF 2 112$_2$. DSR X 104$_1$ may use the binding information to route the ACR stop message.

In step 2, the ACR stop message may be routed from DSR X 104$_1$ to CDF 2 112$_2$, as indicated by the stored binding information. After receiving the ACR interim message, CDF 2 112$_2$ may process the message and respond back with an ACA message (not shown).

In some embodiments, in response to detecting a Diameter message having a stop event type, DSR X 104$_1$ may perform additional actions. For example, after routing the ACR stop message to CDF 2 112$_2$, DSR X 104$_1$ may flush the entry from HE-SBR 102$_1$. DSR X 104$_1$ may also flush or initiate flushing copies of the entry in other HE-SBRs, e.g., by sending update messages to other DSRs and/or HE-SBRs in the network.

In step 3, an HE-SBR update message may be sent from DSR X 104$_1$ to DSR Y 102$_2$. The HE-SBR update message may include a session identifier, a user identifier, and/or other information extracted or derived from the Diameter ACR stop message. The HE-SBR update message may include a binding record or indicate a binding association between message-related information (e.g., a session identifier) and a CDF (e.g., CDF 2 112$_2$). The HE-SBR update message may further indicate that the record or association should be deleted, discarded, and/or flushed. For example, as shown in FIG. 5C, the HE-SBR update message may include a TTL value of zero. After receiving the HE-SBR update message, DSR Y 104$_2$ may flush or initiate flushing the binding information from HE-SBR 102$_2$.

While FIG. 5C depicts ACR messages, it will be appreciated that various Diameter messages, such as credit control request (CCR) and credit control answer (CCA) messages, and various network service nodes, such as HSSs 112 or PCRFs 114, may be used without departing from the scope of the present subject matter.

Figure 6:
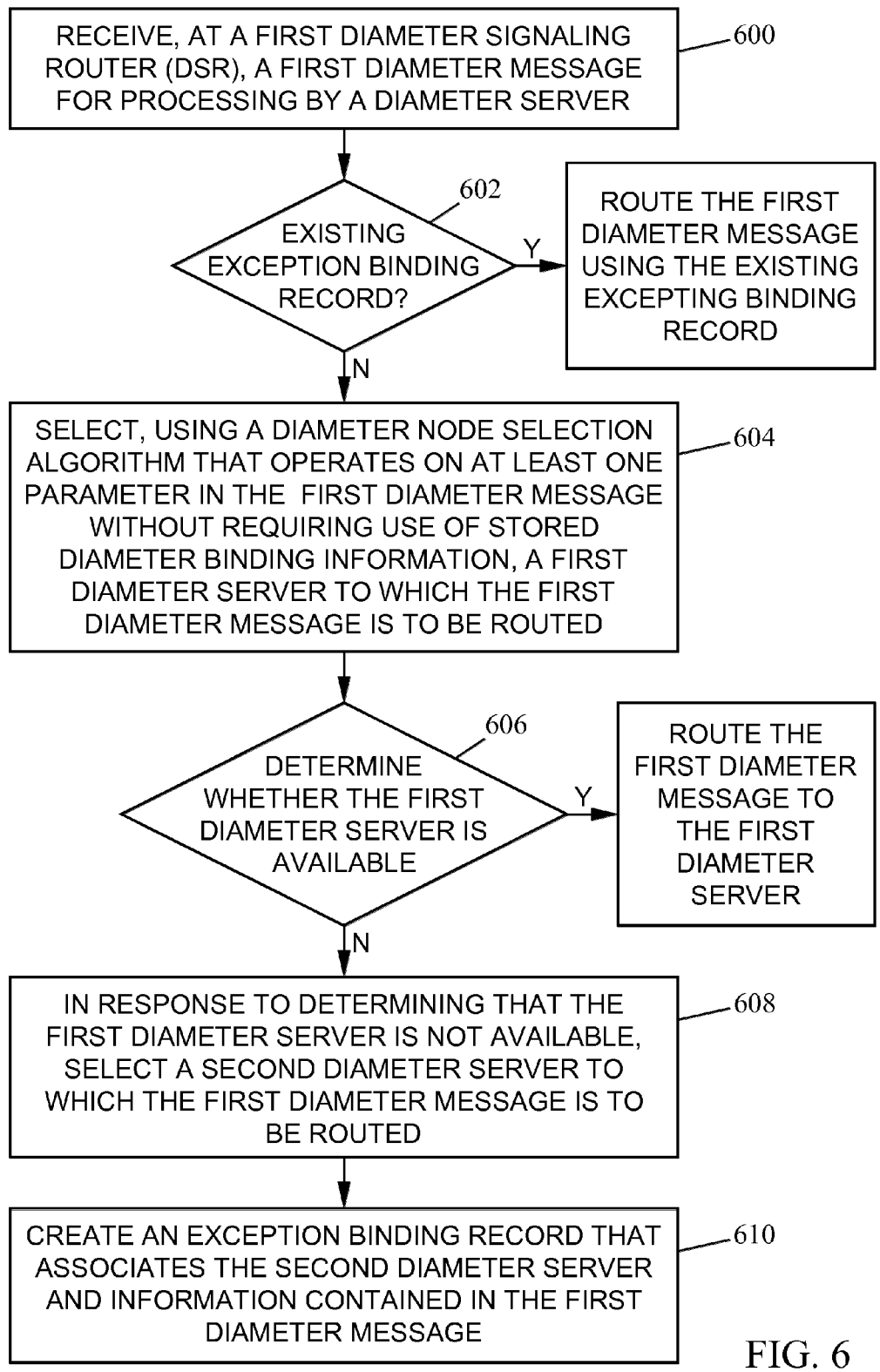
FIG. 6 is a flow chart illustrating an exemplary process for hybrid session based Diameter routing according to an embodiment of the subject matter described herein.

FIG. 6 is a flow chart illustrating an exemplary process for dynamically learning Diameter binding information according to an embodiment of the subject matter described herein. In some embodiments, the exemplary process described herein, or portions thereof, may be performed by a DSR, a DRE, an HE-SBR, and/or other module(s) or node(s).

In block 600, a Diameter signaling message may be received at a Diameter routing node (e.g., DSR X 1044 The Diameter signaling message may be for processing by a Diameter server, such as CDF 1 112$_1$, PCRF 114$_1$, HLR 108, SPR 110, AAA 105, or HSS 106$_1$. For example, DSR X 104$_1$ may include a communications interface that may receive Diameter messages from various interfaces.

In block 602, it may be determined whether a relevant exception binding record already exists. For example, DSR X 104$_1$ or DRE 122 may consult a binding repository for an existing exception binding record that indicates to which node the first Diameter message is to be routed. In this example, if an existing binding record is found, DSR X 104$_1$ or DRE 122 may route the first Diameter message to the node indicated by the existing binding record (e.g., without using a node selection algorithm). If an existing binding record is not found, DSR X 104$_1$ or DRE 122 may select a node using a node selection algorithm.

In block 604, a first Diameter server to which the first message is to be routed may be selected using a Diameter node selection algorithm that operates on at least one parameter in the first Diameter message without requiring use of stored Diameter binding information. In some embodiments, the selection algorithm may include a hashing function or LBHF. For example, DSR 104$_1$ or DRE 122 may be configured to implement an LBHF for load balancing Diameter messages such that all related Diameter messages are processed by the same node.

Exemplary information usable by the Diameter node selection algorithm may include parameters and information derived from received Diameter messages or network nodes. For example, the information may include Diameter session identifier information, user name information, a user Internet protocol (IP) information, IP multimedia subsystem (IMS) private identity (IMPI) information, IMS public identity (IMPU) information, session initiation protocol (SIP) uniform resource identifier (URI) information, a URI, an Internet protocol (IP) address, an access point name (APN), mobile station international subscriber directory number (MSISDN) information, mobile/dialable number information, a session identifier, an international mobile subscriber identity (IMSI), IMS charging identifier information, a mobile subscriber directory number (DN), a globally unique temporary identifier (GUTI), a serving MSC address information, visitor location register (VLR) number information, serving General Packet Radio Service (GPRS) support node (SGSN) address information, SGSN number information, visited mobile country code (MCC) information, mobile network code (MNC) information, a user name attribute value pair (AVP), a network access identifier (NAI), serving location area code information, serving cell identification information, mobile subscriber geo-location coordinate information, or tracking area information.

In block 606, it may be determined whether the first Diameter server is available. For example, DSR X 104$_1$ or DRE 122 may determine whether the first Diameter server is available (e.g., usable to successfully process the message). If it is determined that the first Diameter server is available, DSR X 104$_1$ may route the message to the first Diameter server. If it is determined that the first Diameter server is not available (e.g., that the node is not available or has recently failed), DSR X 104$_1$ may consult or query HE-SBR 102$_1$ for relevant binding information, such as an exception binding record. For example, an exception binding record may indicate an alternate server that can successfully process the Diameter message.

In some embodiments, in response to determining that the first Diameter server is available, the first Diameter message may be routed to the first Diameter server without creating a binding record.

In block 608, in response to determining that the first Diameter server is not available, a second Diameter server to which the first message is to be routed may be selected using a node selection algorithm. In some embodiments, the selection algorithm used for selecting the second Diameter server may be identical or similar to the selection algorithm used for selecting the first Diameter server but may use additional and/or different information, such as a modified session identifier or excluding the first Diameter server as a possible selection.

In some embodiments, after a second Diameter server is selected, DSR 104$_1$ or DRE 122 may confirm that the second Diameter server is usable or available for processing the received Diameter signaling message.

In block 610, an exception binding record may be created. The exception binding record may associate the second Diameter message and information contained in the first Diameter message. For example, a Diameter session ID and/or a user identifier (e.g., an IMSI value or IP address) may be associated with CDF 2 112$_2$ or other network service node identifier.

After creating the exception binding record, DSR X 104$_1$ or DRE 122 may store the record so that the Diameter binding record can be used to quickly route other Diameter messages associated with the transaction, session, or user to the same network service node.

In some embodiments, the exception binding record may be stored in a HE-SBR or related binding database. For example, the exception binding record may be stored in a local HE-SBR 102$_1$ and may be sent to other DBRs associated with other DSRs in the network. In another example, the exception binding record may be stored in a centralized HE-SBR that may be accessible by multiple DSRs located in the network.

In some embodiments, an exception binding record may be discarded after an amount of time has elapsed (e.g., as determined by a time to live (TTL) value associated with a binding record) or after a period of inactivity (e.g., after no Diameter messages for session "X" has been received in 24 hours). For example, to prevent HE-SBR 102$_1$ or related binding database 128 from running out of memory, DSR X 104$_1$, HE-SBR 102$_1$, or another entity may discard old, stale, or inactive binding records from HE-SBR 102$_1$ or related binding database 128.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for hybrid session based Diameter routing, the method comprising:
   receiving, at a first Diameter signaling router (DSR), a first Diameter message for processing by a Diameter server;
   selecting, using a Diameter node selection algorithm that operates on at least one parameter in the first Diameter message without requiring use of stored Diameter binding information, a first Diameter server to which the first Diameter message is to be routed;
   determining whether the first Diameter server is available;
   in response to determining that the first Diameter server is available, routing the first Diameter message to the first Diameter server without a binding record that associates the first Diameter server with information in the first Diameter message being stored in a binding Diameter repository;
   in response to determining that the first Diameter server is not available:
      selecting a second Diameter server to which the first Diameter message is to be routed;
      creating an exception binding record that associates the second Diameter server and information in the first Diameter message; storing the exception binding record in the Diameter binding repository;
   receiving a second Diameter message associated with the first Diameter message; and
   determining, in response to the first Diameter server becoming available for processing Diameter messages associated with the first Diameter message and based on a predetermined amount of time or a message type of a second Diameter message, to route the second Diameter message to the first Diameter server, wherein the predetermined amount of time is within a time period indicated by a time to live (TTL) value associated with the exception binding record.

2. The method of claim 1 including prior to selecting a first Diameter server using a Diameter node selection algorithm, consulting the binding repository for an existing exception binding record that indicates to which node the first Diameter message is to be routed.

3. The method of claim 1 including routing, using the exception binding record, a second Diameter message to the second Diameter server, wherein the second Diameter message is associated with the first Diameter message.

4. The method of claim 1 including communicating the exception binding record to a centralized binding repository, a local binding repository, a remote binding repository, or a second DSR.

5. The method of claim 1 wherein the exception binding record associates a Diameter session and a Diameter server or a subscriber identifier and a Diameter server.

6. The method of claim 1 wherein the message type of the second Diameter message indicates the start of a Diameter charging session.

7. The method of claim 1 wherein the exception binding record is discarded based on a predetermined amount of time or a message type of a Diameter message.

8. The method of claim 1 wherein the DSR includes a Diameter routing node, a Diameter routing agent (DRA), a Diameter proxy agent (DPA), a Diameter redirect agent, a Diameter translation agent, and a Diameter relay agent.

9. The method of claim 1 where the information contained in the first Diameter message includes Diameter session identifier information, user name information, a user Internet protocol (IP) information, IP multimedia subsystem (IMS) private identity (IMPI) information, IMS public identity (IMPU) information, session initiation protocol (SIP) uniform resource identifier (URI) information, a URI, an Internet protocol (IP) address, an access point name (APN), mobile station international subscriber directory number (MSISDN) information, mobile/dialable number information, a session identifier, an international mobile subscriber identity (IMSI), IMS charging identifier information, a mobile subscriber directory number (DN), a globally unique temporary identifier (GUTI), a serving MSC address information, visitor location register (VLR) number information, serving General Packet Radio Service (GPRS) support node (SGSN) address information, SGSN number information, visited mobile country code (MCC) information, mobile network code (MNC) information, a user name attribute value pair (AVP), a network access identifier (NAI), serving location area code information, serving cell identification information, mobile subscriber geo-location coordinate information, or tracking area information.

10. The method of claim 1 wherein the Diameter server includes at least one of: a network charging node, an online charging system (OCS) node, an offline charging system (OFCS) node, a charging trigger function (CTF) node, a charging gateway function (CGF) node, a charging data function (CDF) node, a policy and charging rules function (PCRF) node, a home subscriber server (HSS) node, an authentication, authorization, and accounting (AAA) node, and a home location register node (HLR).

11. A system for hybrid session based Diameter routing, the system comprising:
   at a Diameter signaling router (DSR):
      a communications interface configured to receive a first Diameter message for processing by a Diameter server; and
      a Diameter routing module (DRM) that is communicatively associated with the communications interface, the DRM being configured to select, using a Diameter node selection algorithm that operates on at least one parameter in the first Diameter message without requiring use of stored Diameter binding information, a first Diameter server to which the first Diameter message is to be routed, to determine whether the first Diameter server is available, in response to determining that the first Diameter server is available, routing the first Diameter message to the first Diameter server without a binding record that associates the first Diameter server with information in the first Diameter message being stored in a Diameter binding repository; and in response to determining that the first Diameter server is not available:
         to select a second Diameter server to which the first Diameter message is to be routed;
         to create an exception binding record that associates the second Diameter server and information in the first Diameter message; and
         to store the exception binding record in the Diameter binding repository,
      wherein the DSR is configured to receive a second Diameter message associated with the first Diameter message and determining, in response to the first Diameter server becoming available for processing Diameter messages associated with the first Diameter message and based on a predetermined amount of time or a message type of a second Diameter message, to route the second Diameter message to the first Diameter server and wherein the predetermined amount of time is a time to live (TTL) value associated with the exception binding record.

12. The system of claim 11 wherein the DSR is configured to consult, prior to selecting a first Diameter server using a Diameter node selection algorithm, the binding repository for an existing exception binding record that indicates to which node the first Diameter message is to be routed.

13. The system of claim 11 wherein the DSR is configured to route, using the exception binding record, a second Diameter message to the second Diameter server, wherein the second Diameter message is associated with the first Diameter message.

14. The system of claim 11 the DSR is configured to communicate the exception binding record to a centralized binding repository, a local binding repository, a remote binding repository, or a second DSR.

15. The system of claim 11 wherein the exception binding record associates a Diameter session and a Diameter server or a subscriber identifier and a Diameter server.

16. The system of claim 11 wherein the message type of the second Diameter message indicates the start of a Diameter charging session.

17. The system of claim 11 wherein the DSR is configured to initiate discarding the exception binding record based on a predetermined amount of time or a message type of a Diameter message.

18. The system of claim 11 wherein the DSR includes a Diameter routing node, a Diameter routing agent (DRA), a Diameter proxy agent (DPA), a Diameter redirect agent, a Diameter translation agent, and a Diameter relay agent.

19. The system of claim 11 where the information contained in the first Diameter message includes Diameter session-identifier information, user name information, a user Internet protocol (IP) information, IP multimedia subsystem (IMS) private identity (IMPI) information, IMS public identity (IMPU) information, session initiation protocol (SIP) uniform resource identifier (URI) information, a URI, an Internet protocol (IP) address, an access point name (APN), mobile station international subscriber directory number (MSISDN) information, mobile/dialable number information, a session identifier, an international mobile subscriber identity (IMSI), IMS charging identifier information, a mobile subscriber directory number (DN), a globally unique temporary identifier (GUTI), a serving MSC address information, visitor location register (VLR) number information, serving General Packet Radio Service (GPRS) support node (SGSN) address information, SGSN number information, visited mobile country code (MCC) information, mobile network code (MNC) information, a user name attribute value pair (AVP), a network access identifier (NAI), serving location area code information, serving cell identification information, mobile subscriber geo-location coordinate information, or tracking area information.

20. The system of claim 11 wherein the one or more network service nodes includes at least one of: a network charging node, an online charging system (OCS) node, an offline charging system (OFCS) node, a charging trigger function (CTF) node, a charging gateway function (CGF) node, a charging data function (CDF) node, a policy and charging rules function (PCRF) node, a home subscriber server (HSS) node, an authentication, authorization, and accounting (AAA) node, and a home location register node (HLR).

21. A non-transitory computer readable medium comprising computer executable instructions embodied in a computer readable medium that when executed by a processor of a computer control the computer to perform steps comprising:
receiving, at a first Diameter signaling router (DSR), a first Diameter message for processing by a Diameter server;
selecting, using a Diameter node selection algorithm that operates on at least one parameter in the first Diameter message without requiring use of stored Diameter binding information, a first Diameter server to which the first Diameter message is to be routed;
determining whether the first Diameter server is available;
in response to determining that the first Diameter server is available, routing the first Diameter message to the first Diameter server without a binding record that associates the first Diameter server with information in the first Diameter message being stored in a Diameter binding repository;
in response to determining that the first Diameter server is not available:
selecting a second Diameter server to which the first Diameter message is to be routed;
creating an exception binding record that associates the second Diameter server and information in the first Diameter message;
storing the exception binding record in the Diameter binding repository;
receiving a second Diameter message associated with the first Diameter message; and
determining, in response to the first Diameter server becoming available for processing Diameter messages associated with the first Diameter message and based on a predetermined amount of time or a message type of a second Diameter message, to route the second Diameter message to the first Diameter server, wherein the predetermined amount of time is within a time period indicated by a time to live (TTL) value associated with the exception binding record.

* * * * *